US005555436A

United States Patent [19]
Gavish

[11] Patent Number: 5,555,436
[45] Date of Patent: Sep. 10, 1996

[54] APPARATUS FOR ALLOWING MULTIPLE PARALLEL PORT DEVICES TO SHARE A SINGLE PARALLEL PORT

[75] Inventor: Dan Gavish, Haifa, Israel

[73] Assignee: Intel Corporation, Santa Clara, Calif.

[21] Appl. No.: 570,347

[22] Filed: Dec. 11, 1995

Related U.S. Application Data

[63] Continuation of Ser. No. 165,041, Dec. 10, 1993, abandoned.

[51] Int. Cl.[6] .............................. H04Q 1/00; G06F 13/00
[52] U.S. Cl. .................. 395/821; 395/281; 340/825.03; 340/825.06; 364/DIG. 1; 364/ 241.9; 364/238; 364/235
[58] Field of Search ...................................... 395/101, 822, 395/281, 500, 800; 340/825.03, 825.06, 825.07, 825.52

[56] References Cited

U.S. PATENT DOCUMENTS

| | | | |
|---|---|---|---|
| 4,446,459 | 5/1984 | Bond, Jr. et al. | 340/825.21 |
| 4,607,379 | 8/1986 | Marshall, Jr. et al. | 375/377 |
| 4,635,222 | 1/1987 | Tokui et al. | 395/114 |
| 4,725,836 | 2/1988 | Guidos | 340/825.590 |
| 4,931,722 | 6/1990 | Stoica | 371/22.5 |
| 5,005,151 | 4/1991 | Kurkowski | 395/856 |
| 5,060,134 | 10/1991 | Hunninghaus | 395/250 |
| 5,107,260 | 11/1992 | Meissner et al. | 340/825.52 |
| 5,263,141 | 11/1993 | Sawaki | 395/800 |
| 5,276,443 | 1/1994 | Gates et al. | 340/825.06 |
| 5,359,540 | 10/1994 | Ortiz | 364/492 |

OTHER PUBLICATIONS

Black Box Corporation, Black Box Catalog, Jul. 1985, p. 78.

*Primary Examiner*—Lance Leonard Barry
*Attorney, Agent, or Firm*—Blakely, Sokoloff, Taylor & Zafman

[57] ABSTRACT

An apparatus and system which allows multiple parallel port devices to share a single parallel port of a personal computer. The invention uses the parallel port signal called Select_In which is activated/de-activated by a program running in the personal computer. When a controller within an attached printer senses that this signal is active, it switches the printer to what is referred to as the on-line state. When the printer controller senses that this signal is inactive, it switches the printer to what is referred to as the off-line state. The present invention uses the Select_In signal to distinguish between personal computer accesses to the printer and to other devices which may be attached to the parallel port. When the Select_In signal is not active, the present invention uses a command decoder which first determines by a sequence of characters received that a command is being sent over the parallel port, and once that determination is made, decodes the command so that subsequent signals from the parallel port are directed to one of the non-printer devices, the particular one selected depending on the command received.

20 Claims, 5 Drawing Sheets

APPARATUS FOR ALLOWING MULTIPLE PARALLEL PORT DEVICES TO SHARE A SINGLE PARALLEL PORT

This is a continuation of U.S. patent application Ser. No. 08/165,041 filed Dec. 10, 1993, now abandoned.

BACKGROUND OF THE INVENTION

The printer port (parallel port) of a personal computer (PC) is designed to handle one device attached to it (usually a printer or in some cases a software key plug). However, computer users typically use other parallel port devices in addition to a printer. What is needed is a device which enables multiple parallel port devices to share a single parallel port of a personal computer, and which distinguishes between accesses to printers and non-printer parallel port devices.

SUMMARY OF THE INVENTION

The present invention satisfies the above needs. The present invention enables the effectively simultaneous use of several devices attached to the parallel port. The invention uses the parallel port signal called Select-In which is activated/de-activated by a program running in the PC. When a controller within an attached printer senses that this signal is active, it switches the printer to what is referred to as the on-line state. When the printer controller senses that this signal is inactive, it switches the printer to what is referred to as the off-line state.

The present invention uses the Select_In signal to distinguish between PC accesses to the printer and to other devices which may be attached to the parallel port. When the Select_In signal is not active, the present invention uses a command decoder which first determines by a sequence of characters received that a command is being sent over the parallel port, and once that determination is made, decodes the command so that subsequent signals from the parallel port are directed to one of the non-printer devices, the particular one selected depending on the command received.

Figure 1:
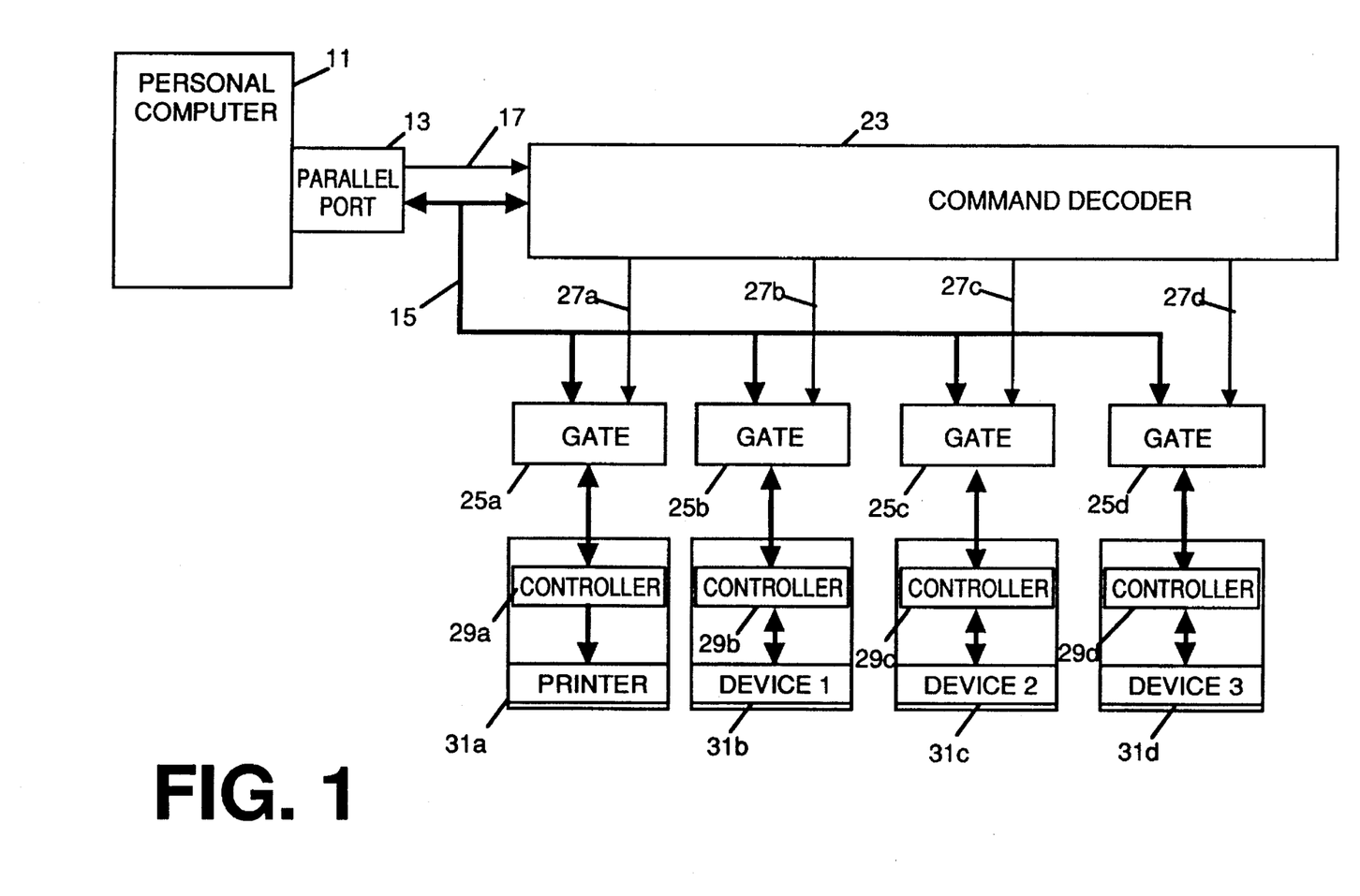
FIG. 1 is a block diagram showing the various components of the invented system and their relationship to each other.

With reference to FIG. 1, PC 11 has a parallel port 13 which is typically a port with 25 pins which can work in various modes such as uni-directional, bi-directional or enhanced parallel port. For example, in bi-directional mode, there are 17 active signals (16 of which are designated by reference number 15 and one of which is designated by reference number 17 in the Figures) as follows: 8 bi-directional data lines, 4 control lines (output) and 5 status lines (input). Table I below shows the various signals available from parallel port 13 in bi-directional mode. The specific meanings of these signals and the manner in which they are generated are well known to persons skilled in the field of the invention, and, therefore, such details will only be provided as needed for an understanding of the present invention.

TABLE I

| Bus | Pin | Signal | Description |
| --- | --- | --- | --- |
| Data | 2–9 | D0:D7 | Data signals 0–7 |
| Control | 14 | ALF | Auto Line Feed |
| Control | 16 | Init | Printer Initialize |
| Control | 1 | Strobe | Data Strobe |
| Control | 17 | Select_In | Printer Select |
| Status | 11 | Busy | Printer Busy |
| Status | 10 | Ack | Data Accepted Acknowledge |
| Status | 12 | Paper_End | Printer Out of Paper |

TABLE I-continued

| Bus | Pin | Signal | Description |
| --- | --- | --- | --- |
| Status | 13 | Select_Out | Printer Select Acknowledge |
| Status | 15 | Error | Printer Error |

Select_In being active indicates a printer cycle (i.e., the period of time during which data, status signals and control signals are being sent to and received from the printer). During what is referred to as a printer cycle, signals generated by the PC intended for a printer are targeted to the parallel port. As long as Select_In is active, the rest of the parallel port signals are interpreted by command decoder 23 as conventional printer port signals and are directed to/from the printer and the parallel port. When Select_In is inactive (indicating a "non-printer cycle"), the rest of the parallel port signals are interpreted by the command decoder as being signals for a device other than the printer and are directed to/from one of the other parallel port devices and the parallel port.

That is, if more than one parallel port device besides a printer is used (i.e., three or more parallel port devices including the printer), then the Select-In signals that are directed to them can be used to select the currently active device. The selection of a particular one of the non-printer devices is done through commands issued by a program running in the PC during non-printer cycles.

BRIEF DESCRIPTION OF THE DRAWINGS

FIG. 5 is a block diagram of gate 25a.

DETAILED DESCRIPTION OF THE INVENTION

The present invention utilizes a hardware component located between the parallel port of a personal computer (PC) and parallel port devices connected to the parallel port and a software component which runs in the PC which sends commands to the hardware component which cause the hardware component to select one of the parallel port devices to receive data and control signals from the parallel port and send data and status signals to the parallel port from the selected parallel port device.

Referring to FIG. 1, the host PC 11 has a parallel port (printer port) 13 which passes data, status and control signals on a bus 15, and the Select_In signal on line 17 to a command decoder 23. Although the Select_In signal is shown separately in FIG. 1, as should be clear from Table I, Select_In is one of the control signals on bus 15. The command decoder in combination with a set of gates, which are designated 25a–25d in FIG. 1, each of which is coupled to a parallel port device being controlled, form the hardware component of the invention. In this description, three parallel port devices plus the printer are assumed, but the invention can be implemented for any number of devices. Thus, the use of four gates is for illustration only and is for four parallel port devices including one printer. The invention is capable of handling fewer or additional parallel port devices so long as there is one gate per parallel port device.

The parallel port signals, other than Select_In, are designated by reference number 15 in FIG. 1. The Select_In signal is designated by reference number 17 in FIG. 1. When Select-In is active, this indicate that signals from parallel port 13 are targeted to printer 31a ("printer cycles"). As long as this signal is active, the rest of the signals are interpreted as conventional printer-port signals. When command decoder 23 senses that Select_In is active, it tells gates 25a, 25b, 25c or 25d, via gate control signals 27a–27d, respectively, to direct parallel port signals 15 directly to/from parallel port 13 and the printer. In particular, the state of signals 27a–27d causes gate 25a to pass parallel port signals to and from the printer controller 29a and causes gates 25b–25d to keep any parallel port signals from being passed to controllers 29b–29d and keeps any signals from controllers 29b–29d from being passed to the parallel port. This control of the parallel port devices is obtained by sending a NOP command, which is stored in a latch internal to each gate, to its corresponding parallel port device 31b–31d, so the device is kept idle.

In contrast, when Select_In is inactive, which indicates cycles targeted at the non-printer devices ("non-printer cycles"), the parallel port signals 15 are interpreted as data and control signals to be sent to one of the non-printer devices 31b–31d and data and status signals from one of the non-printer devices 31b–31d.

Directing the parallel port signals 15 to one of the non-printer devices is accomplished as follows. When command decoder 23 senses that Select_In is inactive, it tells gates 25b–25d, via gate control signals 27b–27d, to direct parallel port signals 15 to/from one of the parallel port devices 31b–31d, respectively, specifying which one of the parallel port devices (31b–31d) is the active one and which ones are inactive. Accordingly, one of the gates 25b–25d directs the parallel port signals either to or from its associated parallel port device 31b–31d. At the same time, the other gates among gates 25b–25d send a NOP command to their associated parallel port devices.

Command decoder 23 decodes the commands received from the PC 11. These commands are used to configure and control the system, that is, to specify which is the currently active parallel port device and to initialize various registers and latches to a known state. These commands are encoded by software running in the PC and transferred to command decoder 23 via the parallel port. This can be implemented in one of several alternative ways, such as:

(1) During a printer cycle (Select_In active), a non-printable sequence of characters or combination of control signals is used to signal the beginning of a command. Then, the encoded command is transferred to the command decoder.

(2) During a printer cycle (Select_In active), a non-reasonable control signal sequence (such as toggling a control signal several times) is used to indicate the beginning of a command. Then, the encoded command is transferred to the command decoder.

(3) During a non-printer-cycle (Select_In inactive), a non-reasonable combination of data and/or control signals which is specific to the presently active parallel port device is used to indicate the beginning of a command. Then, the encoded command is transferred to the command decoder. This third alternative requires "teaching" the command decoder during initialization the non-reasonable combination of data and/or control signals which will be sent for each of the parallel port devices.

(4) When Select_In transitions from inactive to active (indicating the first command to be sent to the printer after a non-printer cycle), the first command is used by command decoder 23 to identify the device to be enabled when Select_In is inactive (Tag insertion mode).

Figure 2:
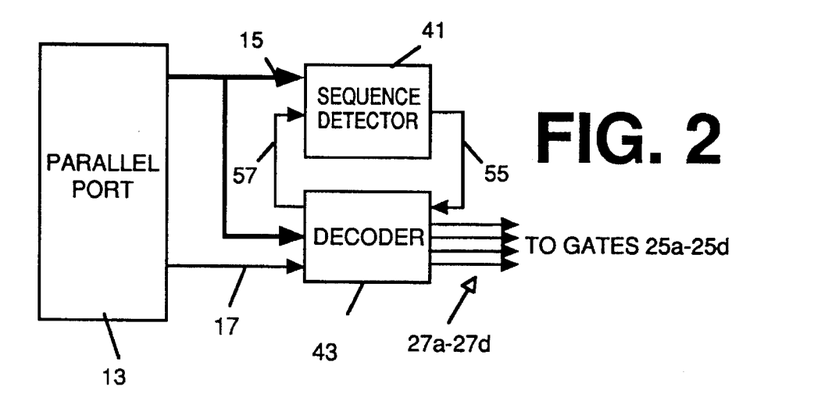
FIG. 2 is a block diagram of command decoder 23.

Referring now to FIG. 2 which is a block diagram of command decoder 23, the command decoder is made of two sections, namely a sequence detector 41 and a decoder 43.

The sequence detector, if enabled as described below, generates a trigger signal 55 when it detects the required sequence of characters from parallel port 13. The sequence detector 41 is enabled when enable signal 57 from decoder 43 is asserted. If the sequence detector is not enabled, sequence detector 41 ignores signals on bus 15 from the parallel port. The required sequence of characters is a sequence of characters which can be used to distinguish between data which should be directed to a previously selected device and a command which is used to select another device as described in detail below.

For the four above-noted alternatives for specifying the active parallel port device for command decoder 23, the differences between the four alternatives or modes with respect to gates 25a–25d and the status of Select_In are shown in Table II.

TABLE II

| MODE | SELECT_IN | GATE OUTPUT CHANGE |
| --- | --- | --- |
| 1. Non-printable sequence of characters | active | immediately |
| 2. Non-reasonable sequence of control signals | active | immediately |
| 3. Non-reasonable combination of data and/or control specific to currently active device | not-active | after deasserting strobe signal |
| 4. Tag insertion | active | immediately |

Figure 3A:
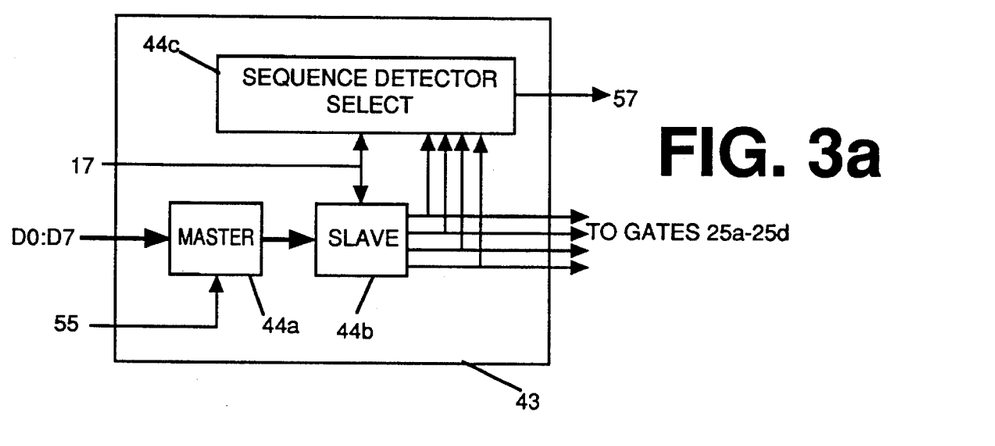
FIG. 3a is a block diagram of decoder 43.

For the first two modes, upon detecting the pre-programmed non-printable sequence of characters or non-reasonable sequence of control signals stored in sequence detector 41 sent after Select_In has gone active, sequence detector 41 asserts trigger 55. Once trigger 55 has been asserted, decoder 43 latches data on bus 15 (e.g., D0:D7) in latch 44a which results in one of the signals on lines 27a–27d being asserted with the others deasserted thereby selecting one of the parallel port devices and deselecting the others as shown in FIG. 3a. During accesses to the non-printer devices (Select_In 17 inactive), enable signal 57 is deasserted so that codes sent to the parallel port devices 31b–31d are ignored by sequence detector 41. During accesses to the printer device, so long as Select_In remains asserted, data, status and control signals on bus 15 are sent between the parallel port and the printer controller. However, once Select_In is deasserted, control on bus 15c is passed to each of gates 25b–25d and input to each gate's MUX 47 and status on bus 15a received from each gate's tri-state buffer 45 (see FIG. 4 where line 15b represents the data (e.g., D0:D7) on bus 15. If the MUX's corresponding control signal (i.e., control signal 27b, 27c or 27d) is asserted, the MUX passes the data on bus 15 to the corresponding device controller. If the MUX's corresponding control signal (i.e., control signal 27b, 27c or 27d) is deasserted, the MUX passes the data containing the NOP instruction from its latch 49 to its corresponding device controller.

When the Select_In signal 17 becomes active, decoder 43 asserts enable signal 57 so that sequence detector 41 is ready to receive the next command as described above. It should be apparent (e.g., see FIG. 3b) that control can be passed from one of the non-printer devices (state 2) to another non-printer device (state 3) since Select_In can be asserted to change the active device (state 0) and then immediately deasserted so that data is sent to and received from the new device.

In the third mode, upon detecting the pre-programmed non-reasonable combination of data and/or control specific to the currently active device sent after Select_In has gone from active to inactive, sequence detector 41 asserts trigger 55. Once trigger 55 has been asserted, decoder 43 latches data on bus 15 e.g., D0:D7. The following mechanism prevents a switch between parallel devices in the middle of a cycle as described in the rightmost column of Table II. This mechanism enables switching to a new device only after toggling the Select_In signal active and inactive and transferring a new device number through master-slave flip flop 44a, 44b as shown in FIG. 3a, which shows the elements of decoder 43. The output to gates 25a–25d remains in its current state until the first activation of the Select_In signal 17. When Select_In is asserted, the data on D0:D7 representing the next device to be selected is transferred into the master latch 44a and a new device is selected as a result of the state of signals 25a–25d from slave latch 44b. As there is a different sequence of illegal codes for every parallel device, the enable signal 57 selects the specific detector 42a for the currently selected parallel port device and disables the other detectors. Since a different "illegal sequence" is applicable for each device, several detectors are used, each tuned to a specific code. The selection of the specific sequence detector is determined by sequence detector select 44c, which, in the described example, with three non-printer parallel port devices, generates a value on line 57 which selects one of three detectors 42a. The three detectors are initialized with a predetermined "illegal sequence" as described below.

For the fourth mode (tag insertion mode), sequence detector 41 reads the first command written after Select_In transitions from inactive to active, where the first command written can be determined by checking the state of the strobe signal (see Table I), from the parallel port. That is, when the strobe signal is active, the first command in a command sequence is being written or sent to the parallel port after the Select_In signal has changed from inactive to active. An example of such a command is a number from 1 to 255 which appears on lines D0:D7 from the parallel port. At this time, even though Select_In is active, decoder 43 does not select the printer, and no enable signal is sent to any parallel device.

Tag insertion mode requires a software driver to operate in the PC so that whenever an attempt is made to activate printer 31a, the first byte which is sent (as determined by the strobe signal being activated and then negated), contains the number of the next parallel port device which will be selected when the Select_In signal returns to the inactive state. Of course, this scheme using a single byte of data can handle 255 parallel port devices which is sufficient for most, if not all, applications. In the example, a simple scheme would be to use the bit stream 0001 for the printer 31a, 0010 for device 31b, 0100 for device 31c and 1000 for device 31d. The number can be the same as for the previous command to continue operation with the previously selected parallel port device once a print cycle has concluded, i.e., when Select_In goes from active to inactive. During a tag insertion cycle, printer gate 25a blocks transmission to the printer, so this command is not sent to the printer. The manner in which printer gate 25a is informed that the signal should not be sent to the printer is by deasserting signal 27a as described below.

Figure 3B:
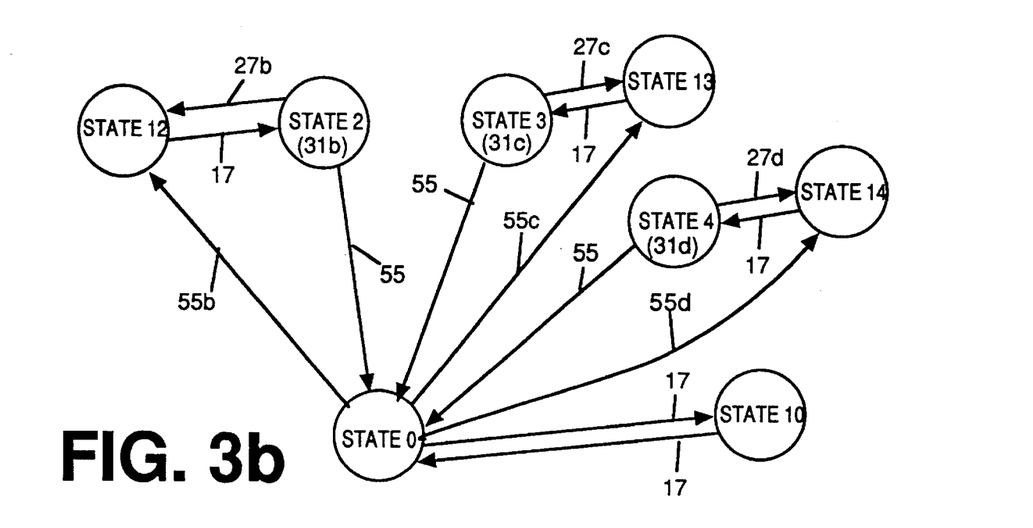
FIG. 3b is a state diagram of decoder 43.
Figure 3C:
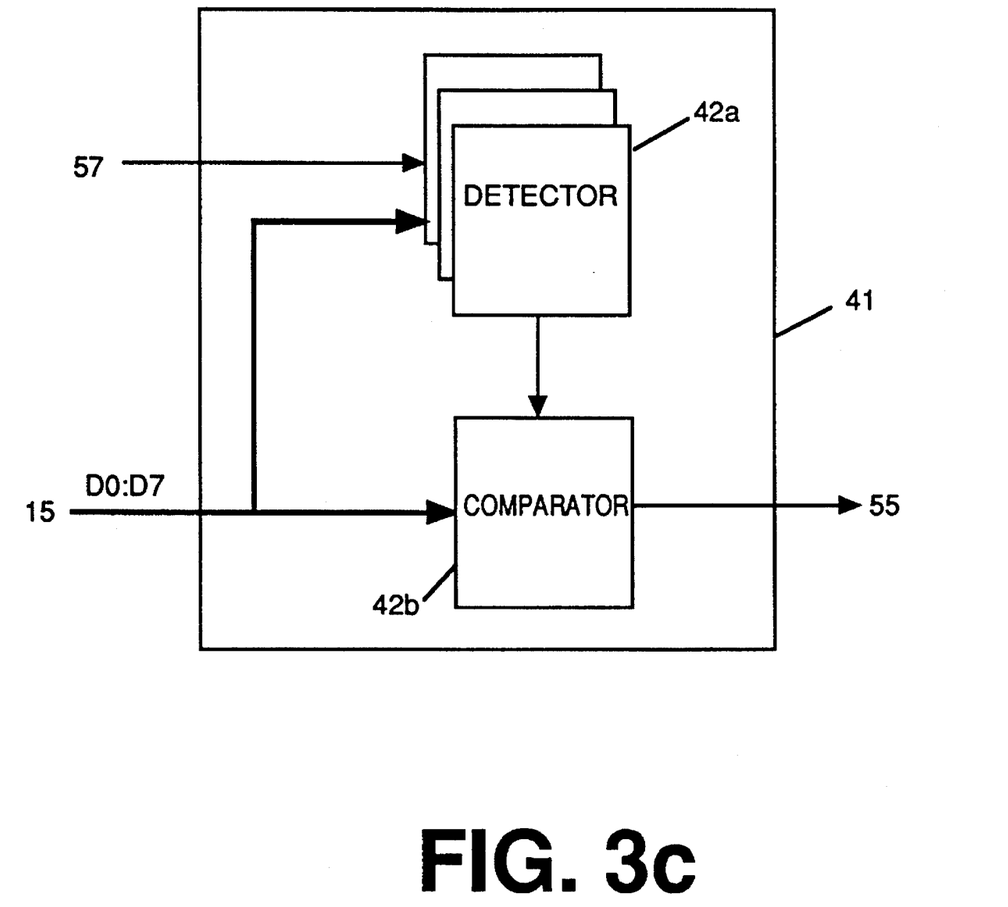
FIG. 3c is a block diagram of sequence detector 41.

Sequence detector 41 is implemented using programmable logic, or a set of registers, which can learn the specific instruction to assert trigger 55. An example of implementing sequence detector 41 for the third mode is as follows. Referring to FIG. 3c, detector 41 may be implemented using a latch 42a which is initialized with the "illegal code" and a comparator 42b to compare the input with the stored value. If for example a command 22H (hex) is never used by the parallel port device this number 22H (referred to as the "illegal instruction") is stored in latch 42a. During initialization, the software running on the PC writes a device specific illegal instruction into a PLD (Programmable Logic Device) equation or into a simple latch. Detector 42a may be implemented using either PLDs which store all equations (one equation per parallel port device), or, a set of latches. This operation is repeated for every parallel device since, in general, each device has a different device specific code. During normal operation, enable signal 57 enables only the sequence detector which was "programmed" to detect the illegal instruction of the selected parallel device. If the input on bus 15 matches the stored code, and the device specific comparator is enabled by enable signal 57 then comparator 42b outputs trigger signal 55. This code is latched in master flip-flop 44a at the end of the non-printer cycle (i.e., when Select_In is activated), and then transferred to slave flip-flop 44b.

Decoder 43 uses the next command written by the PC (i.e., data sent to the parallel port by a program running in the PC), with the strobe signal asserted qualified by the signal Select_In being inactive to identify which of enable signals 27a–27d should be asserted. Such command includes the code of the next selected parallel device, e.g., 1, or 2, or 3.

The decoder 43, which is shown in FIG. 3a can be implemented using a master-slave latch 44a and 44b which stores the number of the next parallel device. Referring now to FIG. 3b, decoder 43 can be in one of the following states:

0—write to internal logic,

10, 12, 13, 14—select printer 31a

2—select parallel device 31b

3—select parallel device 31c

4—select parallel device 31d

The decoder selects a single device when Select_In is inactive. The printer is selected when Select_In is active.

Decoder 43 is reset to state 0 when trigger 55 is asserted by sequence detector 41. The previously selected device remains enabled until the printer is selected by activating the Select_In signal. When the Select_In signal becomes inactive again, the state machine of FIG. 3b is in state 0, at which time the serial number of the new parallel device (i.e., a number from 0 to 255 representing the selected one of the parallel port devices), for example, number 3, is written by the PC and stored in the master flip-flop 44a. After a second activating and deactivating of the Select_In signal, slave flip-flop 44b output changes to state 3 and selects a new parallel port device. The state machine which is shown in FIG. 3b is implemented in the master slave flip-flop 44a, 44b, where trigger signal 55 resets the machine to state 0 and transients 55b, 55c, and 55d are activated by writes to the parallel port device internal logic (master slave flip-flop) after the state machine has entered state 0.

When Printer_select_in signal 17 is active, the select signal 27a is active, no matter what is the "pending" parallel port device. The "pending" parallel port device is defined by the current state of the main state machine (FIG. 3b). By way of example, states 2 and 12 define device 31b as the pending device. However, in state 2 device 31b is actually active, while in state 12 the printer is active, and device 31b is waiting. Once the printer becomes inactive 17, device 31b resumes activity.

Thus, states 2, 3, 4 represent active parallel port devices 31b, 31c and 31d, respectively. States 12, 13, 14 represent pending parallel port devices 31b, 31c and 31d respectively while the printer is active.

State 0 represents writing to internal decoder 43. State 10 represents printer active without any pending parallel device.

The mechanism selects a new parallel device in state 0. After enabling the printer, the machine toggles to the appropriate "printer" state 10, 12, 13 or 14. After negation of the Select_In signal, a new parallel port device is selected.

Figure 4:
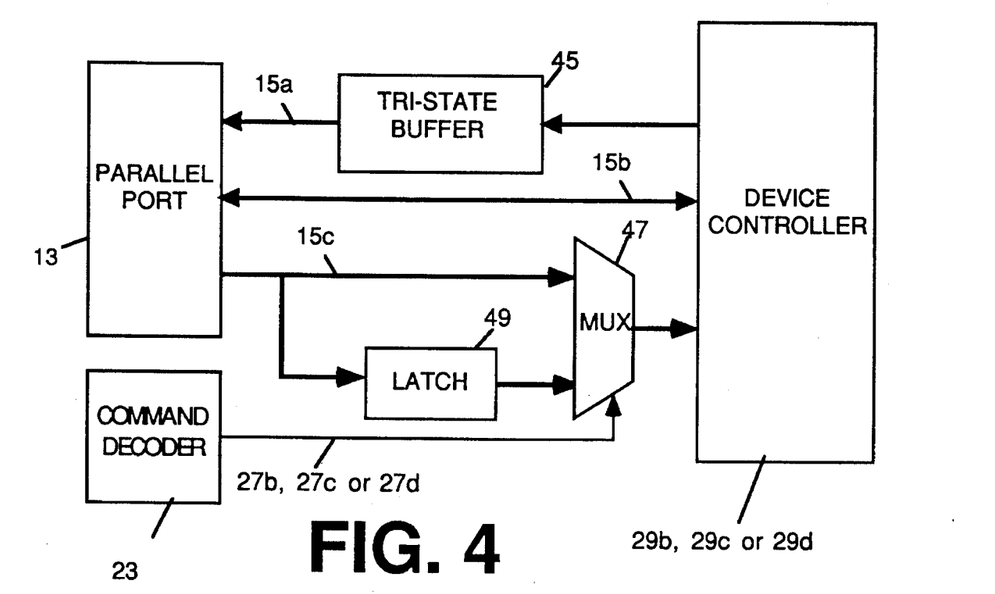
FIG. 4 is a block diagram of one of gates 25b–25d.

Gates 25b–25d have two modes of operation, namely ON—where the commands on line 15 are sent to and from the device 31b–31d to the parallel port 13, and OFF, where communication with the parallel port device is blocked. Gates 25b–25d are made from three blocks as shown in FIG. 4 which shows gate 25b, gates 25c and 25d being identical except that command decoder 23 provides multiplexor control signal 27c and 27d respectively instead of multiplexor control signal 27b. The three blocks are as follows:

1. a tri-state buffer 45 for the printer status input signals 15a.
2. a multiplexor 47 to pass printer command output signals on bus 15c or the NOP command stored in latch 49;
3. a latch 49 to hold the NOP command for the connected parallel port device.

When the parallel port device is blocked as explained below, the five status lines (see Table I) are tri-stated to avoid bus contention. In order to disable the parallel device, its signals are divided into three groups, inputs 15a (status lines in Table I) outputs 15c (command lines in Table I), and data signals 15b (D0:D7 in Table I). The four control lines are driven by a NOP combination of signals, i.e., a combination of signals which is ignored by the specific parallel port device. The source of this combination of signals is latch 49 in each of gates 25b–25d which is pre-loaded by software during initialization for the specific parallel port device to which it is coupled.

The data signals remain connected at all times since by default they are either configured as outputs from PC 13 to the parallel port devices or if a parallel port device uses a bi-directional bus, then it is tri-stated inside the parallel port device.

Figure 5:
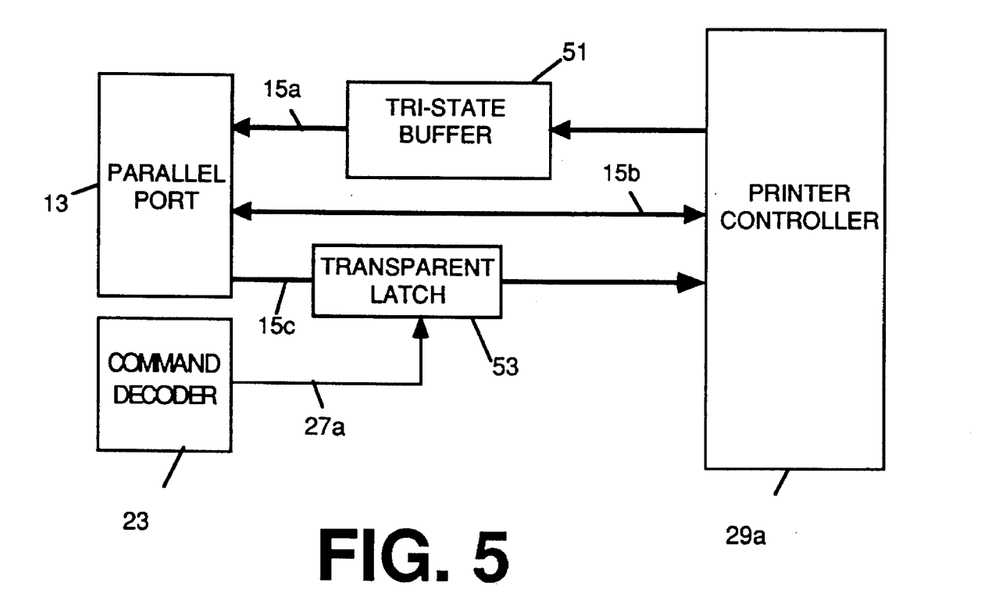

Gate 25a, which is specific to the printer 31a, has two modes of operation, namely ON—where the commands are sent to and from the printer, and OFF where it is disabled.

Gate 25a is a degenerate version of gates 25b–25d which is made from two blocks as follows as shown in FIG. 5:

1. a tri state buffer 51 for the inputs.
2. a transparent latch 53 (such as a 74LS373) to hold the last state of the printer input signals when the printer is on hold (and other devices are activated), or to transfer input signals transparently from the PC to the printer when the printer is active.

Gate 25a latches the last command to the printer in OFF mode, the last state of all control signals is "frozen" by latching them into latch 53 so that the controller 29a in the printer assumes that it is selected, but with no command being sent to it. Therefore, the controller 29a inside the printer will not sense any further activity. The above-noted signals are latched when the Select_In signal goes inactive. Signal 27a from command decoder 23 is provided to transparent latch 53 so that when asserted, the signals on bus 15 are latched. When the signal 27a is asserted, the transparent latch 53 becomes transparent, the tri-state buffer 51 is enabled and the printer signals are transferred without obstruction to and from the PC, so the printer can operate as if it is connected directly to the port.

The main task of the software running in the PC is to dynamically tell command decoder 23 if the current cycle is a printer cycle or a non-printer cycle, and which is the currently active device. All application software packages, specific for each of the parallel port devices, are activated via a software "shell", which controls command decoder 23.

To activate the printer, the software activates the Select-In signal of the parallel port which causes the hardware to connect the PC parallel port to the printer and then lets existing printing software undertake the printing operation.

To activate a non-printer device, the software de-activates the Select-In signal, and tells the hardware, using one of the mechanisms described above, which of the parallel port devices is the currently active device. Then, it enables the application software of the specific device.

Figure 6:
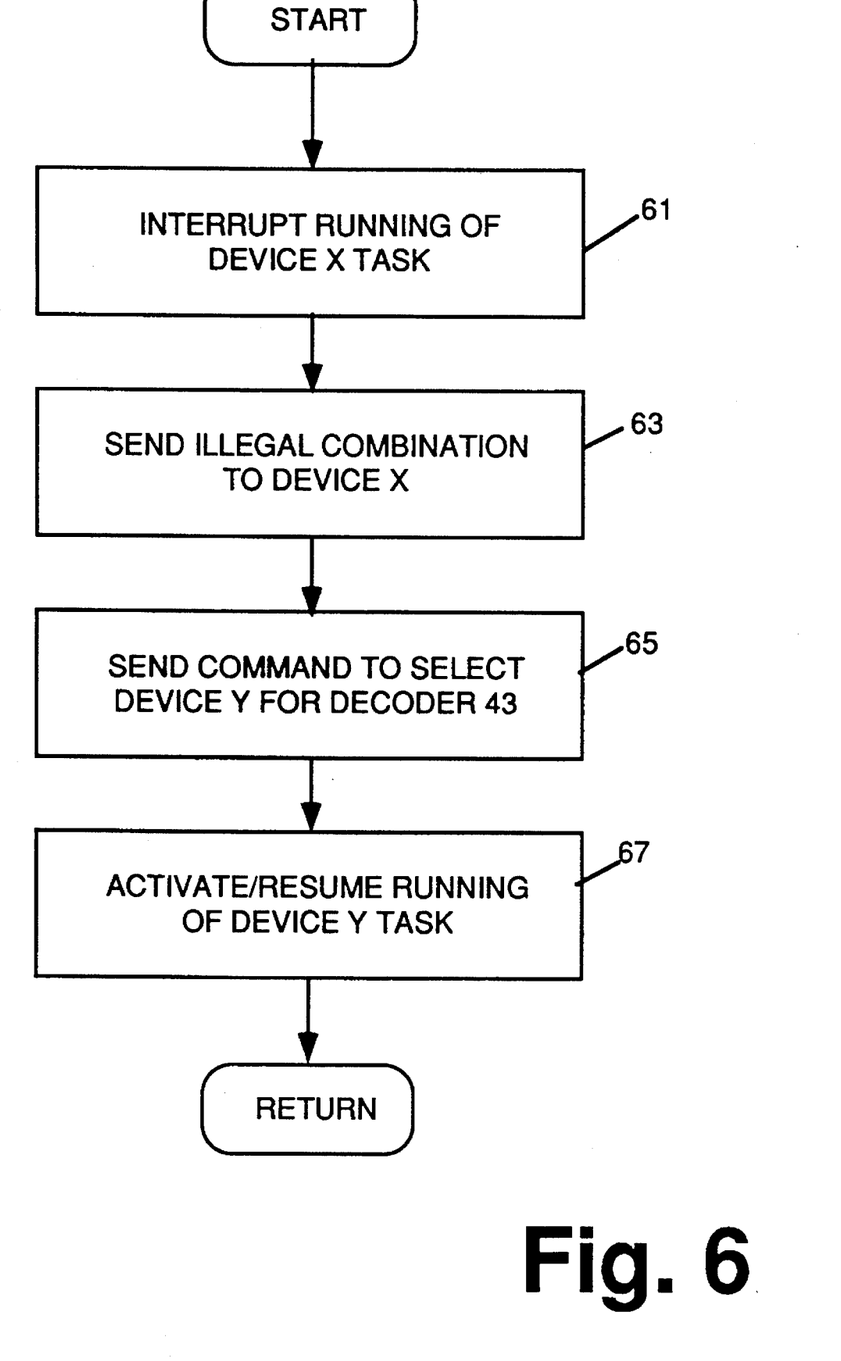
FIG. 6 is a flow chart of a program running in PC 11 which selects the active device connected to the parallel port.

The above mentioned software mechanism of switching from device X to device Y, is presented in the flow-chart shown in FIG. 6. When a request is to be made of device Y, the software first interrupts the task running device X (step 61). Then the illegal instruction or command is sent over the parallel port to the then connected device X (step 63). Next, the command to select device Y is sent to decoder 43 through the parallel port (step 65). Finally, the task which controls device Y is activated or resumed (step 67).

During initialization, software running in the PC "talks" with command decoder 23 to configure the device. This includes the NOP combination of bits which is latched in latch 49 internal to each of the gates, and the parallel port device's non-reasonable sequences, code or sequence (i.e., an "illegal instruction" which is used by detector 41 to identify a switch in parallel device. Master latch 44a is initialized to state 0 of the state machine shown in FIG. 3b and is kept in this state (i.e., disable access to the non printer parallel devices 31b, 31c, 31d until it is configured to state 2 or 3 or 4 by writing a device number to it (1, or 2, or 3) activating and deactivating the Select_In 17 signal.

I claim:

1. An apparatus for coupling a printer parallel port device and a plurality of non-printer parallel port devices to a single parallel port of a personal computer so that each of said parallel port devices can be accessed and controlled by software running in the personal computer with switching between said plurality of parallel port devices being performed under software control and without user intervention, said apparatus comprising:

command decoder means, coupled to said parallel port, for decoding signals from said parallel port into one of (i) commands for selecting a predetermined one of said parallel port devices or (ii) data or (iii) control for passing to a previously selected one of said parallel port devices, said command decoder means includes a dedicated line, when asserted, selects the printer parallel port device as said predetermined one of said parallel port devices;

b) a plurality of gate means, each of said plurality of gate means is coupled to said command decoder means, for passing signals between said parallel port and said predetermined one of said parallel port devices when said command decoder means has selected said predetermined one of said parallel port devices and for maintaining said predetermined one of said parallel port devices in an idle state when said command decoder means has deselected said predetermined one of said parallel port devices.

2. The apparatus defined by claim 1 wherein said command decoder means comprises:

a) a sequence detector means for determining, when enabled, whether signals received from said parallel port are for identifying one of said non-printer parallel port devices and, if so, generating a trigger signal;

b) a decoder means for generating a control signal upon receipt of said trigger signal selecting one of said plurality of non-printer parallel port devices and deselecting the other ones of said plurality of non-parallel port devices and for generating an enable signal for enabling said sequence detector means.

3. The apparatus defined by claim 1 wherein one of said plurality of gate means is for coupling to a printer device.

4. The apparatus defined by claim 1 wherein at least two of said plurality of gate means are for coupling to corresponding non-printer parallel port devices.

5. The apparatus defined by claim 4 wherein each of said at least two of said plurality of gate means comprises a tri-state buffer, a latch and a multiplexer, said tri-state buffer and said latch for coupling to a controller of said non-printer device and said parallel port, said tri-state buffer adapted to send signals from said non-printer controller to said parallel port and said latch being adapted to send a predetermined code to said controller to maintain said non-printer device in said idle state, said multiplexer adapted to selectively send data to said controller from said latch and said parallel port under control from its said associated gate means.

6. An apparatus for coupling a printer parallel port device and a plurality of non-printer parallel port devices to a single parallel port of a personal computer so that each of said parallel port devices can be accessed and controlled by software running in said personal computer with switching between said plurality of parallel port devices being performed under software control and without user intervention, said apparatus comprising:

a) command decoder means for coupling said parallel port for decoding signals from said parallel port into one of commands for selecting a predetermined one of said parallel port devices or data or control for passing to a previously selected one of said parallel port devices, said command decoder means including i) a sequence detector means for determining, when enabled, whether signals received from said parallel port are for identifying one of said non-printer parallel port devices, said sequence detector means including at least one detector, coupled to said parallel port and a decoder means, adapted to be initialized with a set of values, each value representing a predetermined one of said parallel port devices, and a comparator, coupled to said at least one detector and said parallel port, adapted to compare data signals from said parallel port device with said values and to assert a trigger signal upon determining that a match exists, and ii) said decoder means for generating a control signal upon receipt of said trigger signal selecting one of said plurality of non-printer parallel port devices and deselecting the other ones of said plurality of non-parallel port devices and for generating an enable signal for enabling said sequence detector means; and b) a plurality of gate means, each coupled to said command decoder means for coupling to a predetermined one of said parallel port devices for passing signals between said parallel port and its associated parallel port device when said command decoder means has selected its said associated parallel port device and maintaining its said associated parallel port device in an idle state when said command decoder means has deselected its said associated parallel port device.

7. The apparatus defined by claim 6 wherein said at least one detector comprises a set of latches.

8. The apparatus defined by claim 6 wherein said at least one detector comprises a set of programmable logic devices.

9. An apparatus for coupling a printer parallel port device and a plurality of non-printer parallel port devices to a single parallel port of a personal computer so that each of said parallel port devices can be accessed and controlled by software running in said personal computer with switching between said plurality of parallel port devices being performed under software control and without user intervention, said apparatus comprising:

a) command decoder means for coupling said parallel port for decoding signals from said parallel port into one of commands for selecting a predetermined one of said parallel port devices or data or control for passing to a previously selected one of said parallel port devices said command decoder means including i) sequence detector means for determining, when enabled, whether signals received from said parallel port are for identifying one of said non-printer parallel port devices and, if so, generating a trigger signal, and ii) decoder means for generating a control signal upon receipt of said trigger signal selecting one of said plurality of non-printer parallel port devices and deselecting the other ones of said plurality of non-parallel port devices and for generating an enable signal for enabling said sequence detector means, said decoder means includes a master slave flip-flop for coupling to said parallel port and coupled to said sequence detector means and a plurality of gate means and sequence select logic, said master slave flip-flop being adapted to generate a signal for activating one of said plurality of gate means and deactivating other of said plurality of gate means; and b) said plurality of gate means, each coupled to said command decoder means, for coupling to a predetermined one of said parallel port devices, for passing signals between said parallel port and its associated parallel port device when said command decoder means has selected its said associated parallel port device and maintaining its said associated parallel port device in an idle state when said command decoder means has deselected its said associated parallel port device.

10. An apparatus for coupling a printer parallel port device and a plurality of non-printer parallel port devices to a single parallel port of a personal computer so that each of said parallel port devices can be accessed and controlled by software running in said personal computer with switching between said plurality of parallel port devices being performed under software control and without user intervention, said apparatus comprising:

a) command decoder means for coupling said parallel port for decoding signals from said parallel port into one of commands for selecting a predetermined one of said parallel port devices or data or control for passing to a previously selected one of said parallel port devices; and b) a plurality of gate means, each coupled to said command decoder for coupling to a predetermined one of said parallel port devices for passing signals between said parallel port and its associated parallel port device when said command decoder means has selected its said associated parallel port device and maintaining its said associated parallel port device in an idle state when said command decoder has deselected its said associated parallel port device, wherein each of said plurality of said gate means comprises a tri-state buffer and a transparent latch for coupling to a printer controller of said printer and said parallel port, said tri-state buffer is adapted to send signals from said printer controller to said parallel port and said transparent latch is adapted to send signals from said parallel port to said printer controller.

11. A system having a hardware component and a software component, said hardware component for coupling a printer parallel port device and a plurality of non-printer parallel port devices to a single parallel port of a personal computer so that each of said parallel port devices can be accessed and controlled by said software component running in said personal computer with switching between said plurality of parallel port devices being performed under software control and without user intervention, wherein said hardware component comprises:

a) command decoder means for coupling to said parallel port for decoding signals from said parallel port into one of commands for selecting a predetermined one of said parallel port devices or data and control for passing to a previously selected one of said parallel port devices;

b) plurality of gate means, each coupled to said command decoder and for coupling to a predetermined one of said parallel port devices for passing signals between said parallel port and its associated parallel port device when said command decoder means has selected its said associated parallel port device and maintaining its said associated parallel port device in an idle state when said command decoder has deselected its said associated parallel port device;

and said software component comprises:

a program running in said personal computer which operates to cause a switch from a first parallel port device to a second parallel port device Y wherein when a request is to be made of said second device, the software:

i) interrupts a task for controlling the first device;

ii) sends an illegal instruction or command over the parallel port to the then connected first parallel port device;

iii) sends a command to select said second parallel port device to said command decoder means through the parallel port; and iv) activates the task which controls the second parallel port device.

12. The system defined by claim 11 wherein said command decoder means comprises:

a) a sequence detector means for determining, when enabled, whether signals received from said parallel port are for identifying one of said non-printer parallel port devices and, if so, generating a trigger signal;

b) a decoder means for generating a control signal upon receipt of said trigger signal selecting one of said plurality of non-printer parallel port devices and deselecting the other ones of said plurality of non-parallel port devices and for generating an enable signal for enabling said sequence detector means.

13. The system defined by claim 12 wherein said sequence detector means comprises a detector means coupled to said parallel port and said decoder means and a comparator coupled to said detector means and said parallel port, wherein said detector means is adapted to be initialized with a set of values, each value representing a predetermined one of said parallel port devices and said comparator is adapted to compare data signals from said parallel port device with said values and assert said trigger signal upon determining that a match exists.

14. The system defined by claim 13 wherein said detector means comprises a set of latches.

15. The system defined by claim 13 wherein said detector means comprises a set of programmable logic devices.

16. The system defined by claim 12 wherein said decoder means comprises a master-slave flip-flop for coupling to said parallel port and coupled to said sequence detector means and said plurality of gate means and sequence select logic, said master slave flip-flop being adapted to generate a signal for activating one of said plurality of gates means and deactivating other of said plurality of gate means.

17. The system defined by claim 11 wherein one of said plurality of gate means is for coupling to a printer device.

18. The system defined by claim 17 wherein said gate means comprises a tri-state buffer and a transparent latch, said tri-state buffer and said transparent latch for coupling to a printer controller of said printer and said parallel port, said tri-state buffer adapted to send signals from said printer controller to said parallel port and said transparent latch being adapted to send signals from said parallel port to said printer controller.

19. The system defined by claim 11 wherein at least two of said plurality of gate means are for coupling to a non-printer device.

20. The system defined by claim 19 wherein each of said at least two of said plurality of gate means comprises a tri-state buffer, a latch and a multiplexor, said tri-state buffer and said latch for coupling to a controller of said non-printer device and said parallel port, said tri-state buffer adapted to send signals from said non-printer controller to said parallel port and said latch being adapted to send a predetermined code to said controller to maintain said non-printer device in said idle state, said multiplexor adapted to selectively send data to said controller from said latch and said parallel port under control from its said associated gate means.

* * * * *